United States Patent
Burns et al.

(10) Patent No.: US 6,877,964 B2
(45) Date of Patent: Apr. 12, 2005

(54) MULTIFUNCTION MICROFLUIDICS DEVICE

(75) Inventors: Daniel J. Burns, Rome, NY (US); Thomas E. Renz, Marcy, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 72 days.

(21) Appl. No.: 10/289,539

(22) Filed: Nov. 6, 2002

(65) Prior Publication Data

US 2004/0086390 A1 May 6, 2004

(51) Int. Cl.[7] .......................... F04B 17/00; F04B 39/00; F04B 23/00
(52) U.S. Cl. .................... 417/410.1; 417/572; 417/313; 137/625.33; 137/625.38
(58) Field of Search .............................. 417/410.1, 313, 417/481, 572; 137/512.1, 625.33, 625.37, 625.38

(56) References Cited

U.S. PATENT DOCUMENTS

| | | | | |
|---|---|---|---|---|
| 490,146 A | * | 1/1893 | James | 137/625.33 |
| 2,601,231 A | * | 6/1952 | Smith et al. | 137/625.33 |
| 3,853,268 A | * | 12/1974 | Schneider | 137/625.33 |
| 4,624,693 A | * | 11/1986 | Marra et al. | 137/625.33 |
| 5,054,522 A | * | 10/1991 | Kowanz et al. | 137/625.33 |
| 5,400,824 A | * | 3/1995 | Gschwendtner et al. | 137/625.33 |

* cited by examiner

Primary Examiner—Cheryl Tyler
Assistant Examiner—Timothy P. Solak
(74) Attorney, Agent, or Firm—Joseph A. Mancini

(57) ABSTRACT

Apparatus for inducing, impeding, selectively filtering or otherwise effecting fluid flow in microfluidics applications. Opposing mesh layers are placed into relative motion by a variety of motive forces. Fluid between the opposing mesh layers is compressed so as to be pumped through the mesh layers when the relative motion of the layers is toward each other. Mesh layers may also be offset from each other though an actuating force so that one mesh layer blocks the openings in the other mesh layer, thereby creating an impediment to fluid flow. The degree of offset may be varied so as to create a partial impediment to fluid flow, thereby presenting a filter effect.

26 Claims, 5 Drawing Sheets

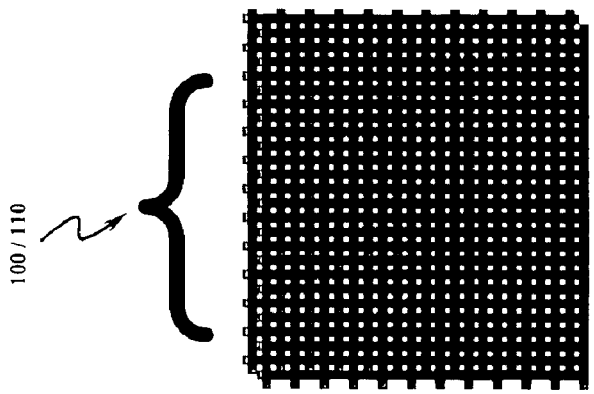
Figure 3
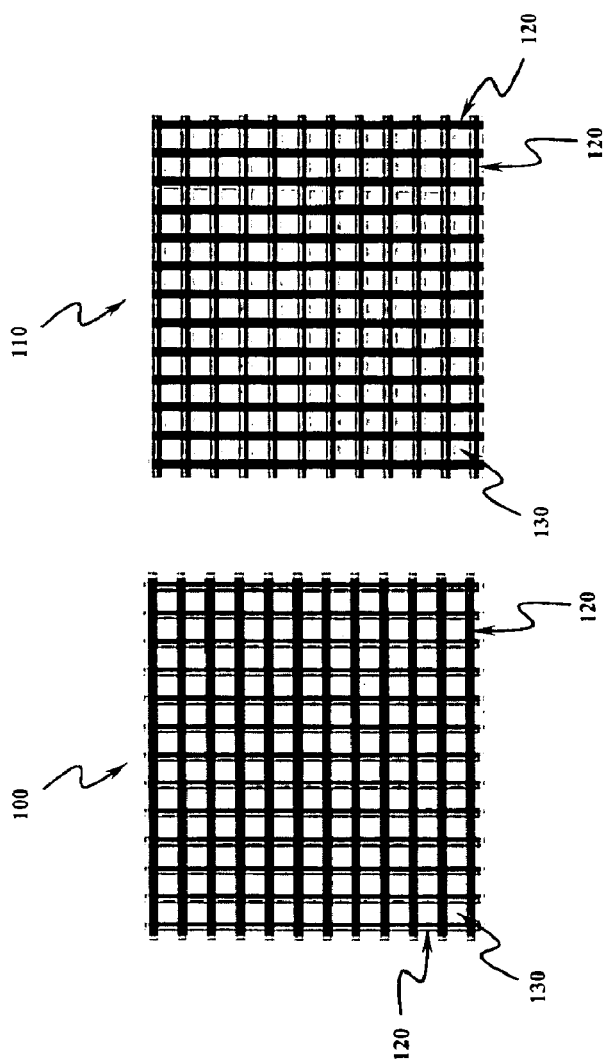
Figure 2
Figure 1

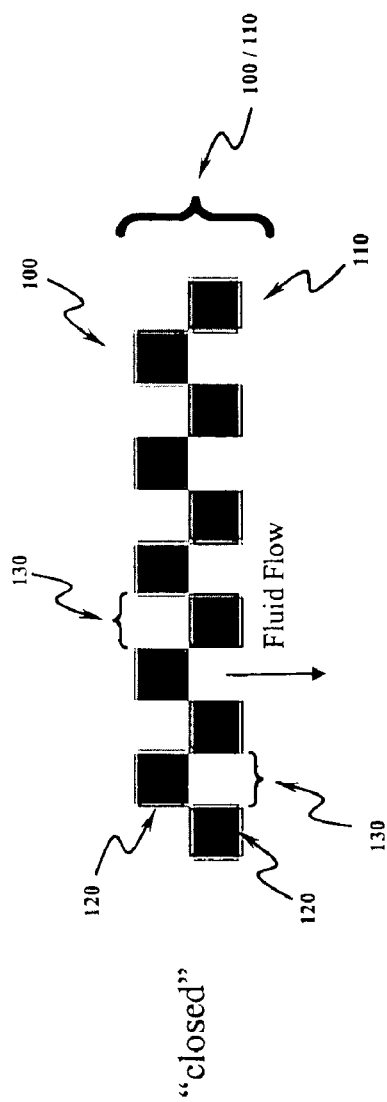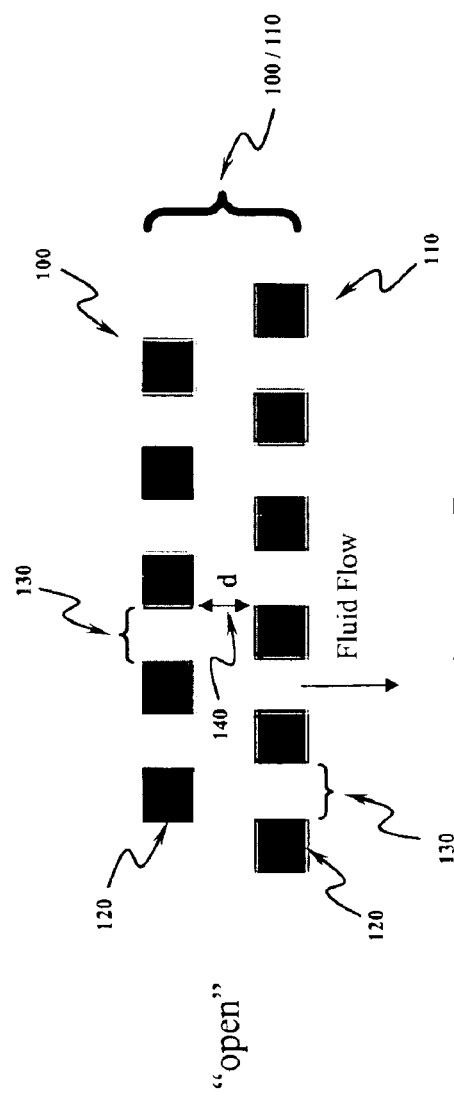

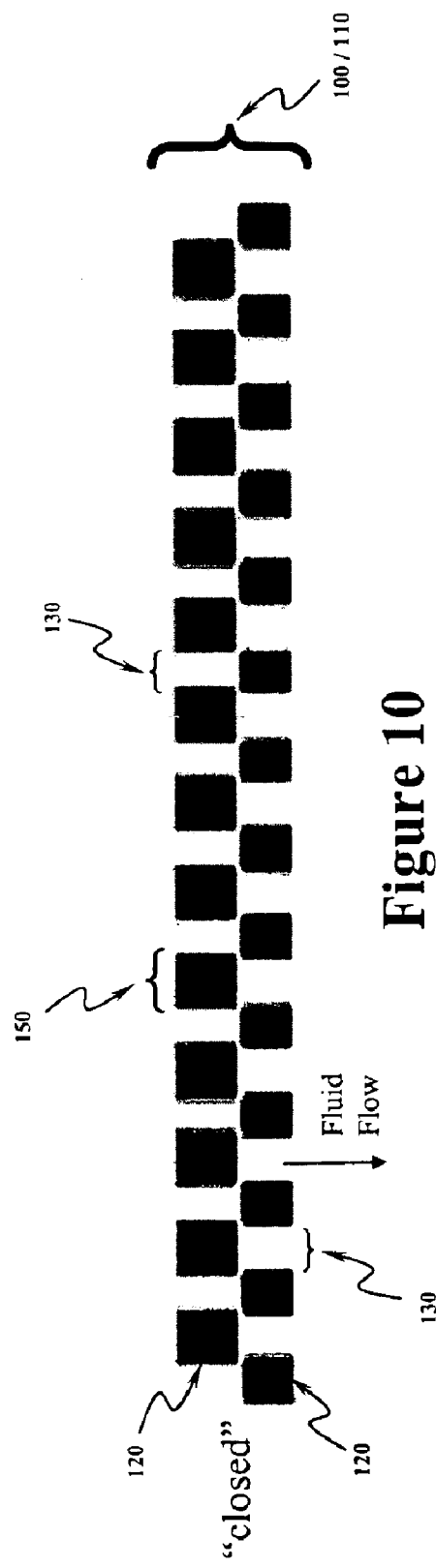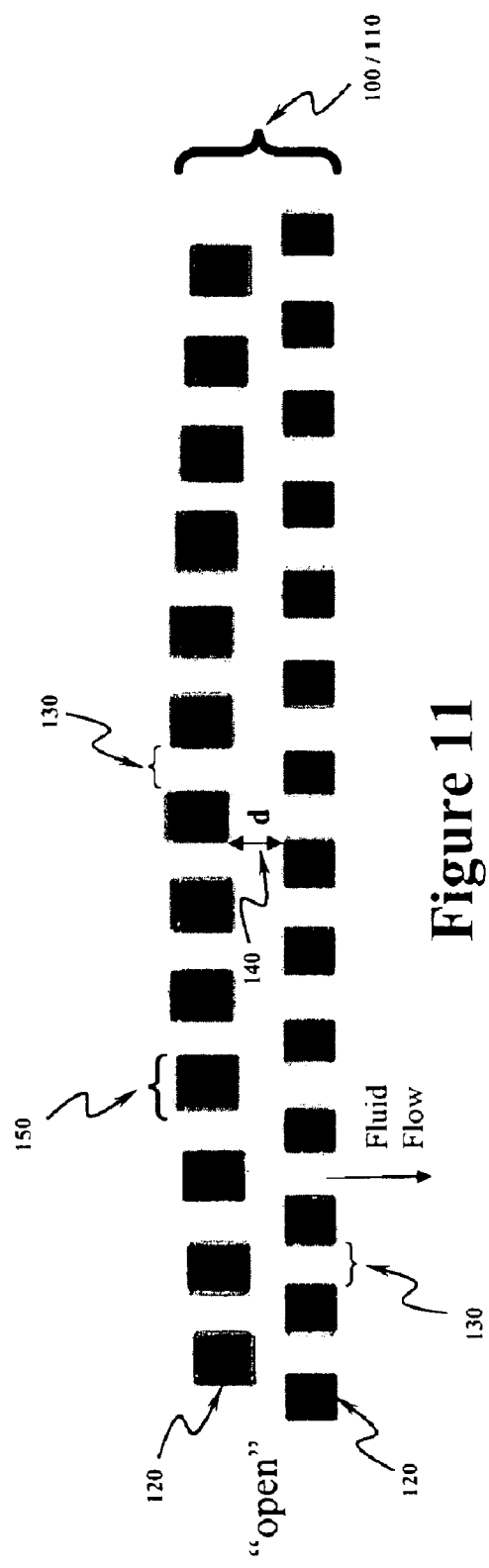

MULTIFUNCTION MICROFLUIDICS DEVICE

STATEMENT OF GOVERNMENT INTEREST

The invention described herein may be manufactured and used by or for the Government for governmental purposes without the payment of any royalty thereon.

BACKGROUND OF THE INVENTION

Microfluidics is a relatively new area of technology that is developing as a result of advances in microfabrication, biology, and information processing research that is focusing attention on the realization of compact systems and even single chip level implementations that can run collections of biological processes on tiny samples of biological fluids and materials. For example, there is an extreme urgency for developing cheap and fast assays for toxin identification based on analysis of blood, saliva, tissues, and the protein or DNA extracted from these sources. Also, large and ready markets exist for point of care diagnostic tests that similarly draw health, disease susceptibility, and drug therapy indicator information from these and other sources. Part of the difficulty of realizing these systems is gathering the knowledge about how to process and extract information from such samples. Another part of the problem is realizing safe, effective, inexpensive, and durable systems for running the bio-process reactions and readouts necessary for researching and eventually commercializing the envisioned tests. Examples of the processes that might be used are fluid gathering, filtering, mixing with reagents, managing the flow of small quantities of fluids and biomaterials through systems of channels and elements involved in performing the reactions and reading out the results. There is pressure on developers of bioassay platforms to develop smaller, even credit card or implant-able chip size means for running such tests.

OBJECTS AND SUMMARY OF THE INVENTION

One object of the present invention is to provide a multifunction microfluidics apparatus for performing a variety of functions including pumping, filtering, or blocking the flow of, fluid.

Another object of the present invention is to provide a microfluidics apparatus that is amenable to construction using microelectromechanical (MEMS) techniques and structures.

Yet another object of the present invention is to provide a microfluidics apparatus that is an integrated unit that can be immersed in a microfluidic channel.

Still another object of the present invention is to provide a microfluidics apparatus which induces, impedes or filters fluid flow using a simple pair of opposing micro-mesh layers and where the layers are induced to motion or actuated by a variety of motive forces.

The invention disclosed herein provides an apparatus for inducing, impeding, selectively filtering or otherwise effecting fluid flow in microfluidics applications. Opposing mesh layers are placed into relative motion by a variety of motive forces. Fluid between the opposed mesh layers is compressed so as to be pumped through the mesh layers when the relative motion of the layers is toward each other. Mesh layers may also be offset from each other though an actuating force so that one mesh layer blocks the openings in the other mesh layer, thereby creating an impediment to fluid flow. The degree of offset may be varied so as to create a partial impediment to fluid flow, thereby presenting a filter effect to the fluid flow.

According to an embodiment of the present invention, multifunction microfluidics device, comprises a first mesh layer; a second mesh layer; the first and the second mesh layers being overlaid onto each other; and at least one of the first or the second mesh layers being capable of movement with respect to each other so as to cause fluid flow in a preferred direction.

According to a feature of the present invention, multifunction microfluidics device, comprises first and the second mesh layers which are offset with respect to each other; wherein the preferred direction of fluid flow is through the structure comprising the first and the second mesh layers; and farther comprising means for positioning the first and the second mesh layers so as to alternately form an "open" and a "closed" position, wherein the "open" position comprises a relative separation between the first and the second mesh layers and wherein the "closed" position comprises a lesser separation.

According to another feature of the present invention, multifunction microfluidics device, comprises means for offsetting the first and the second mesh layers with respect to each other so as to allow the bars of one layer to block the openings between the bars of the other layer.

According to yet another feature of the present invention, multifunction microfluidics device, comprises a motive force means for inducing the movement in at least one of the first mesh layer or the second mesh layer, and where the motive force means is selected from the group consisting of: electrical, thermal, mechanical, magnetic, electromechanical, electromagnetic, light, stress, and chemical means for inducing motive forces.

According to feature of several embodiments of the present invention, multifunction microfluidics device, a microfluidics pump, filter or check valve may be realized.

According to feature of several embodiments of the present invention, microelectromechanical (MEMS) structures may be employed in the fabrication thereof.

Advantages and New Features

One advantage of the present invention is that it holds the potential for performing multiple operating functions in one integrated device, as opposed to using different individual devices from the prior art that would normally be used. This would possibly save space and result in more compact, and possibly less expensive application systems.

Another advantage of the present invention, unlike prior art polymer pumps, is that it is thought that the entire pump structure of the present invention can be made from solid silicon or silicon dioxide materials, including the support cage and motion controlling features. In fact, the entire structure may be immersable in the fluid being pumped, if the fluid is reasonably high in resistivity. This would eliminate the requirement to isolate parts of the structure for the fluid with fluid seals, and might enable operation in fluids that are not friendly to polymers.

BRIEF DESCRIPTION OF THE DRAWINGS

FIG. 1 depicts mesh layer 1.

FIG. 2 depicts mesh layer 2.

FIG. 3 depicts mesh layer 1 and mesh layer 2 overlaid and offset.

FIG. 4 depicts a cross-section view of mesh layer 1 and mesh layer 2 overlaid and offset being in the "closed" position.

FIG. 5 depicts a cross-section view of mesh layer 1 and mesh layer 2 overlaid and offset being in the "open" position.

FIG. 10 depicts a cross-section view of mesh layer 1 and mesh layer 2 overlaid and in the "closed" position with upper mesh having a metallized upper surface to act as a heater for inducing deflection.

FIG. 11 depicts a cross-section view of mesh layer 1 and mesh layer 2 overlaid and in the "open" position with upper mesh having a metallized upper surface to act as a heater for inducing deflection.

DETAILED DESCRIPTION OF THE PREFERRED EMBODIMENT

Figure 7:
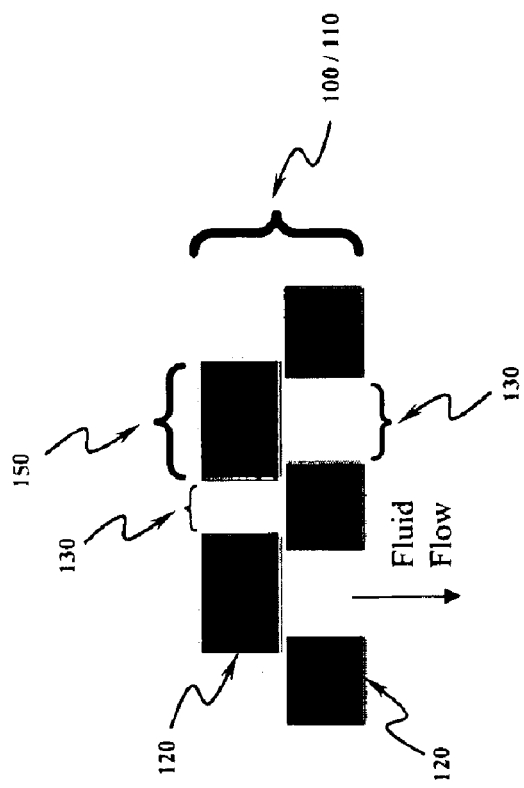
FIG. 7 depicts a cross-section view of mesh layer 1 and mesh layer 2 overlaid with different upper and lower bar widths but the same center-to-center spacing.

The basic structure that forms the multifunction microfluidics pump/filter/mixer/check valve embodiment of the present invention comprises at least a two layer stack of sandwiched, offset meshes (see FIGS. 1, 2, and 3, 100, 110, 100/110) that are shaped and made to move with respect to each other in ways intended to cause net fluid flow in a preferred direction across the structure. Each mesh layer (see FIG. 1, 100; see FIG. 2, 110) could be a rectangular arrangement of orthogonally arranged bars (see FIG. 1, FIG. 2, FIGS. 4–9, 120) in a single plan, like a window screen. However, instead of being woven, the bars of the mesh could be fabricated in a plane using silicon or polymer formation and etching methods, such as selective deposition and etching, like those used in the microelectronics, microelectomechanical, and microfluidics industries. It is thought that it would be possible to purposefully design the mesh side view cross-sections, and the mesh-to-mesh layer overlap profile of the at least two layers of meshes, and the manner of relative movement of the at least two mesh layers in such a way that there would be net fluid flow in a preferred direction across the pump. The mixing, filtering, and check valve operating modes discussed above are thought to arise naturally as a result of the form and operating motions of the envisioned structure. In its basic form, two mesh layers would be used, with a first mesh layer (see FIG. 1, 100) fixed to a substrate in a way that exposes one face of the first mesh layer to fluid adjacent to the mesh in a channel or reservoir. The opposite face of the first mesh layer would be exposed to a fluid channel or reservoir also exposed to a nearby suspended second mesh layer. The second mesh layer (see FIG. 2, 110) would be suspended in a frame of flexures, and fitted with a means for moving the second mesh layer with respect to the first mesh layer. The most basic type of motion could be simply increasing and decreasing the distance between the proximate faces of the first and second mesh layers, along a line normal to the plane of the faces. For the purpose of illustration, let us suppose that the motion that causes the separation distance "d" (see FIG. 5, 140 and FIGS. 11, 140) to increase and decrease is in the vertical direction, along the Z-axis. It is expected that as the second mesh layer be raised, with the first mesh layer held stationary, the separation between the first and second mesh layers will increase, and the volume of the space between the proximate faces of the mesh layers will also increase. As a result of the increase in volume, fluid will flow into the space between the proximate faces of the first and second mesh layers. If the sides of the meshes (the edges in the X-Y plane) be bounded by surfaces that tend to restrict fluid flow outward in the X and Y directions and upward or downward in the Z direction, the fluid that flows into the space between the mesh faces will have to come through one or both of the mesh layers. Similarly, it is expected that as the second mesh layer be lowered, with the first mesh layer held stationary, the separation between the proximate faces of the first and second mesh layers will decrease, and the volume between the proximate faces of the mesh layers will decrease. As a result of the decrease of volume, fluid will exit the space between the proximate faces of the mesh layers. Again, if fluid flow is restricted outward toward the edges of the mesh layers in the X and Y directions by bounding surfaces, the fluid exiting the space between the mesh layers will flow through either or both of the mesh layers. Although the fluid could enter and exit the volume between the mesh layers by passing through either or both of the two mesh layers, it is the purpose of this invention to specify certain design features of the first mesh, and of the second mesh, and of the particular types of relative motion of the two mesh layers with respect to one another, that taken together result in a preferred direction of net fluid flow through the mesh openings or "holes" (see FIGS. 1–2, and FIGS. 4–9, 130) between the mesh bars. For example, if the preferred direction of net fluid low through the device is downward, and if the second mesh layer if above the first mesh layer, the design features are chosen to encourage fluid flow in through the second mesh layer from the channel or reservoir above the top of the second mesh layer when the distance between the mesh layers is increased by raising the second mesh layer, and to restrict fluid flow through the first mesh layer in from the channel or reservoir below the first mesh layer during this part of the motion cycle. Similarly, with the mesh layers still arranged as before, in the same part of the motion cycle, the design features are chosen to discourage fluid flow in through the first mesh layer from the channel or reservoir below the first mesh layer. Also, with the mesh layers arranged as before, but in the part of the motion cycle that decreases the separation between the mesh layers, the design features are chosen to encourage fluid flow through the first mesh layer, out to the channel or reservoir below the first mesh layer, and the design features are chosen to discourage fluid flow through the second mesh out to the channel or reservoir above the second mesh.

It is anticipated that one specific design feature of the mesh layers that may be chosen and varied to encourage and discourage directional fluid flows through them will be the cross-sectional shape of the bars that make up the meshes. Specifically, if the bars that make up the first mesh are thinner at the top and thicker on the bottom (see FIG. 9, 120), and the bars that make up the second mesh are thicker at the top and thinner at the bottom (see FIG. 9, 120), there should be less resistance to fluid flow in the downward direction than in the upward direction, thereby causing net fluid flow in the downward direction through the motion cycle. It also is anticipated that a specific design feature relating to the type of relative motion of the mesh layers that may be chosen and varied to encourage and discourage directional fluid flows through them will be the relative alignment between the mesh holes and bars in the X-Y plane. Specifically, it is thought that if the meshes are aligned in the X-Y plane so that the holes (see FIGS. 1–2, and FIGS. 4–9, 130) in the meshes overlay one another during the part of the motion cycle that bring the meshes farther apart as the second mesh is raised, fluid flow in from the bottom will discouraged as compared to undergoing the same motion with the bars of the second mesh aligned over the holes in the first mesh. Also, it is thought that if the meshes are aligned in the X-Y plane so that the bars of the second mesh overlay the holes in the first mesh during the part of the motion cycle that brings the meshes closer together as the second mesh is lowered will encourage directional fluid flow downward through the first mesh layer.

Although the cross-sectional shape of the bars of the mesh layers and the relative alignment of the bars and holes in the two mesh layers during different parts of the motion cycle are envisioned as specific design features that will result in a preferred net directional fluid flow through the multifunction microfluidics pump invention disclosed herein, other design features and operating modes of mesh layer pumps can be envisioned and are considered to be within the scope and spirit of this invention. For example, mesh bar cross-sections that are vertical, linearly varied from top to bottom, or curved from top to bottom may all be useful, and are within the scope of this invention. Also, motion cycles in which the relative alignment of the bars and holes in the two mesh layers is not varied during different parts of the cycle, or is varied in only one of the X and the Y directions, or is varied in both the X and Y directions may be useful and are considered to be within the scope of this invention. Further, other patterns of openings and obstructions in the mesh layers, such as circular holes instead of a crosshatch of bars might be useful and is considered to be within the scope of this invention.

The motion of the meshes could be accomplished by mounting either or both of the meshes in a frame that can be moved by thermal or electrical or mechanical means provided in the prior art (e.g. microelectromechcnical systems technology). However, another means for moving the mesh or meshes is to coat the top surface of one or both meshes with a conducting film that can act as either or both of an electric field controlled actuator, or a current controlled thermal heater. In the case of an electric field controlled actuator, applying a varying electric potential to the surface conduction film might move a mesh, while also holding another conduction surface or item nearby that is connected to a constant or varying electric potential. In the case of a current-controlled thermally actuated moving mesh or meshes, current could be run across the face of the mesh through the surface conducting film, thereby causing heating and flexing of the mesh due to thermal expansion and contraction as the current is varied. (see FIG. 11) If the mesh material is conducting or semiconducting, it may be possible to get the same electrical or thermal motion control without using a deposited surface coating. Finally, it may be possible to add a pattern of conduction surface layer to parts of the surface of the meshes to otherwise control or sense properties of the fluid and particles nearby.

It is thought that some mixing of the materials flowing through the pump described herein would occur naturally as a result of moving around and through the meshes. It might very well be possible to enhance this mixing action by varying the type of motion in the motion cycle. For example, it might be useful to vary the frequency of motion cycles, or even the direction of flow, if that is possible by varying the relative alignment of holes in the meshes. Other features designed to provide enhanced mixing may be obvious to one skilled in the art, and are also considered to be within the scope of the present invention (e.g. reverse flow clean).

Finally, the meshes will act as filters for particles contained in the fluid flowing through them. Interestingly, although it is now possible to make etched feature sizes on the order of a micron and even a tenth of a micron (100 nanometers), it may be possible now, or in the near future, to make meshes or arrays of pores with even smaller hole sizes, say approaching a few tens of nanometers. The incorporation of such 'micro-meshes' and 'nano-meshes' as the mesh layers of the present invention could make the device useful for filtering gold nano-particles of the sort being used in the prior and developing art as a substrate for hosting chemicals or antibodies that are part of diagnostic tests or chemical reaction monitoring schemes involving flourophors, or even as display elements or data containing elements. In the extreme, if it might be possible to incorporate nano-meshes or arrays of nano-pores with openings on the order of tens of nano-meters, which would be useful for filtering and segregating large molecules, such as DNA strands or proteins.

Referring to FIG. 1, 100 and FIG. 2, 110 and top views of the basic mesh layers and the overlapped, offset arrangement FIG. 3, 110 are depicted.

Referring to both FIG. 4 and FIG. 5, a side view of a section taken left to right through the structure of FIG. 3 at a location between two of the horizontal bars, is depicted. With a very small separation "d" 140 between the upper and lower meshes (closed position), fluid will be substantially blocked from flowing across the structure (e.g. from top to bottom). With a larger separation "d" 140 between the upper and lower meshes (open position), fluid and particles with sizes smaller than the mesh size will be able to enter the space between the upper and lower meshes. It is thought that fluid would be caused to flow from top to bottom if the lower mesh is held stationary while the upper mesh is repeatedly raised to the open position and lowered to the closed position. This could be accomplished by fixing the position of one of the meshes, and moving the other mesh (or both meshes) to achieve a relative separation.

Still referring to both FIG. 4 and FIG. 5, the respective closed and open positions possible with such an arrangement are depicted. It is also anticipated that there would be both filtering and mixing of the fluid and suspensions or mixtures of particles and chemicals in the fluid as it the substance is drawn into the space between the meshes during opening, and again as it flows out of the lower mesh during closing. Also, it is significant to note that a check-valve mode is integral with the pumping action of the structure, unlike other approaches that use rotary or bore/stroke and valve arrangements. That is, fluid flow would be impeded in the reverse direction when closed as in FIG. 4.

Figure 6:
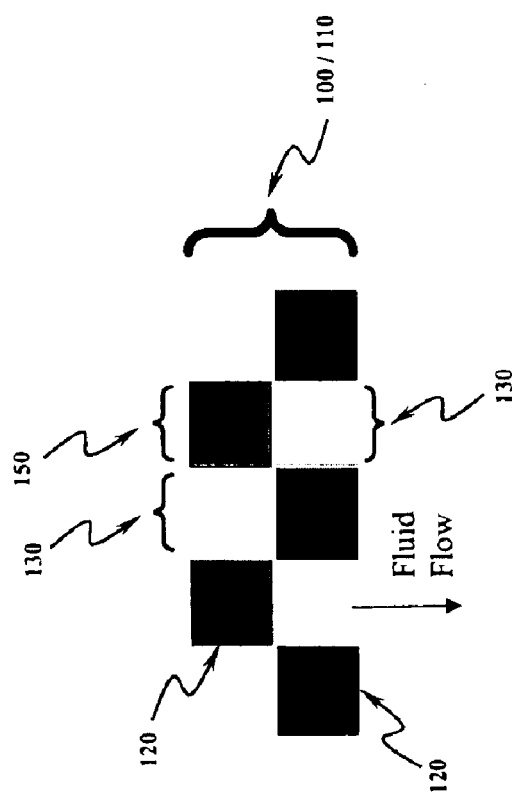
FIG. 6 depicts a cross-section view of mesh layer 1 and mesh layer 2 overlaid with the same bar widths and center-to-center spacing.

Referring to FIG. 6, one concern about the operation of these structures is that if the upper and lower meshes are identical, i.e. have the same bar widths 150 and the same bar center-to-center spacing, there may be leakage across the structure in the bottom to top direction when closed because of imperfect offset alignment.

Still referring to FIG. 6, a section of the meshes in the closed position, with bar 120 of the same relative widths 150, similar to FIG. 4, is depicted. Slight misalignment of the offset of the two meshes would create leakage paths that would allow fluid to flow backward through the structure (bottom to top), especially if there is a pressure rise across the pump. Such leakage due to misaligned offsets in the closed position might be reduced be making the bar 120 wider in the upper mesh, as shown in FIG. 7, again in the closed position. This might be straightforward to accomplish by modifying the mesh fabrication process, whether the bars are etched or grown.

Another concern is that movement of the upper mesh up and down might simply pull and push the same amount of fluid up and down through the structure. To operate as a pump, it is necessary that there be features and operating modes that result in a net volume of flow that is larger in the preferred direction when integrated across the operating cycle consisting of an up-stroke and a down-stroke sequence. However, it might only be necessary to achieve a very slight net flow through each hole 130, because there will be such a large number of holes 130 in the mesh to contribute to the flow. Even so, it is anticipated that the 'pumping' action might be enhanced by a number of modifications.

Figure 8:
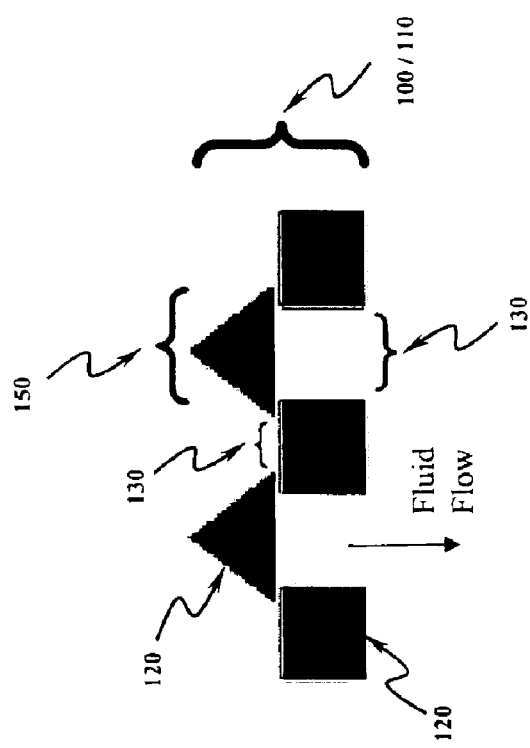
FIG. 8 depicts a cross-section view of mesh layer 1 and mesh layer 2 overlaid with the same center-to-center spacing but triangular upper mesh bar cross-section.

Referring to FIG. 8, one modification that is expected to improve pumping efficiency is to use a triangle shaped upper mesh bar 120, as depicted. It would be possible to achieve this by using anisotropic etching techniques, with the lower surface of the upper bar 120 protected from etching, perhaps prior to release if fabricated using a MEMS process. It is thought that the sharp upper point at the top of the triangle shape would present less resistance to the fluid as the bar 120 rises, tending to push the liquid to the sides and making it swirl back under the lower surface.

Figure 9:
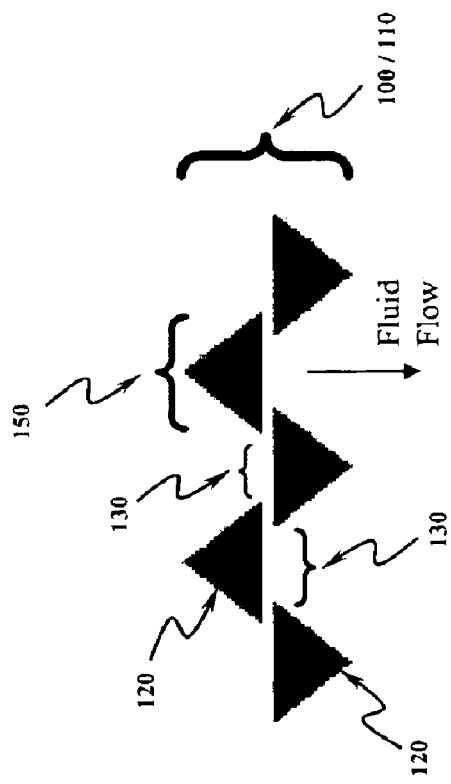
FIG. 9 depicts a cross-section view of mesh layer 1 and mesh layer 2 overlaid with the same center-to-center spacing but with triangular upper and lower mesh bar cross-sections.

Referring to FIG. 9, another modification that is expected to increase the pumping efficiency is to use a triangle shaped bar 120 in the upper mesh 100, and an inverted triangle shaped bar 120 in the lower mesh, as depicted. Another similar modification would be to use a square bar 120 in the upper mesh and an inverted triangle bar 120 shape in the lower mesh. Using an inverted triangle shape for the bars in the lower mesh 110 would help because the resistance to fluid flows would be less in the downward flow direction than in the upward flow direction, adding a natural check valve-like effect.

Referring again to FIG. 4 and FIG. 5, the mesh pump structures 100/110 depicted might operate by moving the upper 100 and lower 110 meshes apart and together substantially in planes oriented parallel to one another. A still further modification that would enhance the pumping action of such mesh structures would be to reduce or remove the offset of the meshes during the up stroke, and to re-introduce it on the down stroke. This could be accomplished if the meshes are fabricated or mounted in a surface machined, microelectromechanical system (MEMS) arrangement that enables relative lateral movement of one or both of the meshes in one or both directions perpendicular to the direction of fluid flow. Thus, on the up-stroke, the offset in the alignment of the meshes would be removed, and the lower face of the bars 120 of the rising top mesh would tend to draw fluid upward, but in some less efficient way that involves more lateral components of motion of the fluid in order to try to 'follow' the bar surface upward. This might induce less backflow during the up-stroke than leaving the meshes offset. On the down stroke, re-introduction of the offset of the meshes would tend to allow the falling lower surface of the top mesh 100 to push fluid directly down through the openings 130 in the lower mesh 110.

Referring now to FIG. 10 and FIG. 11, another modification is shown where a new operating mode is introduced wherein the top surface of the upper mesh 100 is coated with a conductive layer that would act as a heater when current is run through it, e.g. from edge or point of the mesh to another. Naturally occurring residual stresses often do result in a preferred direction of bowing, and possibly even bowing with no current applied. It would seem possible to use heating cooling cycles to deform, 'bow' or 'bulge' one of the meshes (see FIG. 11) to achieve closed and open positions, as shown. If residual stress is such that there is no bowing when cool, FIG. 10 would correspond to the cool state where no current is applied, and FIG. 11 would correspond to the hot state where current is applied. If residual stress is such that there is bowing when cool, this scheme might still work, even if both the upper 100 and lower 110 mesh have a residual bow in the cool state. In this case, the upper mesh would simply bow more when heated with current. Of course, the bows and relative bows of the meshes could be controlled by other means, e.g. the heating by absorption of light, or by mechanical stress applied at some edge or point on the meshes. Finally, the parallel movement or bow of the meshes could also be controlled by electromagnetic means, e.g. using magnetic coatings and controlled magnetic fields, or even by the use of third or fourth fixed meshes facing the upper or lower pumping meshes that would be biased with potentials that would attract or repel the pumping meshes to cause them to open and close. In the later case, if the pumping meshes were not bowed by residual stress, the induced movement of the meshes might naturally result in bowing, even if the pumping meshes are 'fixed' by tethers along their edges. In fact, it might be good to use a circular shape the meshes.

It seems entirely possible that with the teaching included in this description, it would be possible for someone skilled in the art of MEMS design and fabrication to build the structures envisioned. It should also be possible to simulate the envisioned structures and prove whether they work or not. This might lead to other improvements, as well. What is thought to be unique about these structures is the use of such a simple structure consisting of movable offset meshes of very small dimensions to accomplished integrated pumping, filtering, mixing, and check-valve operating modes.

The proposed mesh layer pump would have advantages over these prior art pumps in terms of relative easy of manufacture, especially compared to polymer layered pumps, and possibly durability and reliability, especially over the rotating types. It is thought that basically no new fabrication steps would be needed over the standard microelectromechanical systems technology for making surface of bulk resonators and filters of the type being developed and used for a variety of sensing and communication uses.

It is thought that the interfacing of the device described in the present invention to microfluidics channels and other elements would be no more difficult than interfacing microfluidics pumps, filters, and mixers described in the prior art. In fact, it might be easier because the device may be more compatible with the manufacturing methods used to make channels and reservoirs. This is so because compared to polymer layer pumps, no polymer deposition and patterning is needed, and in the case of rotary pumps, no assembly of the rotor to an axel is needed. The envisioned mesh pump may very well be totally 'self-assembled' by virtue of being etched from the multiple stacked layers of silicon polysilicon, and metal/oxide sandwiches normally available in the typical microelectromechanical device fabrication processes (e.g. MUMPS, LIGA, or MOSIS). While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. In the field of microfluidics, apparatus for effecting fluid flow, comprising:
   a first mesh layer;
   a second mesh layer;
   said first and said second mesh layers being overlaid onto to each other; and
   at least one of said first or said second mesh layers being moved at least two dimensions with respect to each other;
   wherein said movement imparts motion to fluid disposed between said first and said second mesh layers thereby inducing fluid flow in a preferred direction.

2. Apparatus of claim 1, wherein said first and said second mesh layers are offset with respect to each other, and wherein each of said first and said second mesh layers further comprise a plurality of orthogonally arranged bars.

3. Apparatus of claim 2, further comprising means for offsetting said first and said second mesh layers with respect to each other so as to allow the bars of one said layer to block the openings between the bars of the other said layer.

4. Apparatus of claim 3, wherein the width of said bar of one said layer is equivalent to the width of said openings between said bars of said other layer.

5. Apparatus of claim 3, wherein said width of said bar of one said layer is greater than the width of said openings between said bars of said other layer, so as to overlap.

6. Apparatus of claim 3, 4, or 5, wherein the cross-section of said bars of either said mesh layers is selected from the group consisting of: square cross-section, rectangular cross-section; or triangular cross-section, and wherein either said mesh layers may be so selected in any combination.

7. Apparatus of claim 2, further comprising means for positioning said first and said second mesh layers so as to alternately form an "open" and a "closed" position, wherein said "open" position comprises a relative separation between said first and said second mesh layers and wherein said "closed" position comprises a lesser separation.

8. Apparatus of claim 7, wherein said "closed" position comprises a lack of separation.

9. Apparatus of claim 7, further comprising:
   means for eliminating said offset during relative movement precedent to said first and said second mesh layers being in said "open" position; and
   means for reintroducing said offset during relative movement precedent to said first and said second mesh layers being in said "closed" position.

10. Apparatus of claim 7, further comprising a motive force means for inducing said movement in at least one of said first mesh layer or said second mesh layer.

11. Apparatus of claim 10, wherein said motive force means is selected from the group consisting of: electro-thermal, mechanical, magnetic, electromechanical, electromagnetic, light, stress, and chemical means for inducing motive forces.

12. Apparatus of claim 11, wherein said motive force means is electro-thermal, further comprising means for passing an electrical current through a conductive layer applied to at least one of said first mesh layer or said second mesh layer, so as to cause deflection in at least one of said first mesh layer or said second mesh layer relative to said other mesh layer.

13. Apparatus of claim 11, wherein said motive force means is electro-thermal, further comprising means for applying an electrical voltage across a conductive layer applied to at least one of said first mesh layer or said second mesh layer, so as to cause deflection in at least one of said first mesh layer or said second mesh layer relative to said other mesh layer.

14. Apparatus of claim 10, 11, 12, or 13 wherein the application of said motive force is applied in an alternating manner so as to induce repetitive "opening" and "closing" of said first and said second mesh layers.

15. Apparatus of claim 14, said apparatus being a microelectromechanical (MEMS) structure.

16. Apparatus of claim 1, wherein said preferred direction of fluid flow is through the structure comprising said first and said second mesh layers.

17. A microelectromechanical (MEMS) device for effecting fluid flow, comprising:
   a first mesh layer;
   a second mesh layer;
   said first and said second mesh layers being overlaid onto to each other; and
   at least one of said first or said second mesh layers being moved in at least two dimensions with respect to each other;
   wherein said movement imparts motion to fluid disposed between said first and said second mesh layers thereby inducing fluid flow in a preferred direction.

18. Microelectromechanical (MEMS) device of claim 17, further comprising means for applying a motive force means to at least one of said first and said second mesh layers so as to alternately form an "open" and a "closed" position, wherein said "open" position comprises a relative separation between said first and said second mesh layers and wherein said "closed" position comprises a lesser separation.

19. Microelectromechanical (MEMS) device of claim 18, wherein said motive force means is selected from the group consisting of: electro-thermal, mechanical, magnetic, electromechanical, electromagnetic, light, stress, strain, and chemical means for inducing motive forces.

20. A microelectromechanical (MEMS) check valve for alternatively permitting or impeding fluid flow, comprising:
   a first mesh layer;
   a second mesh layer;
   said first and said second mesh layers being overlaid onto to each other; and
   at least one of said first or said second mesh layers being moved in at least two dimensions with respect to each other so as to alternately permit fluid flow or impede fluid flow.

21. Microelectromechanical (MEMS) check valve of claim 20, further comprising means for applying a motive force means to at least one of said first and said second mesh layers so as to alternately form an "open" and a "closed" position, wherein said "open" position comprises a relative separation between said first and said second mesh layers and wherein said "closed" position comprises a lesser separation.

22. Microelectromechanical (MEMS) check valve of claim 21, wherein said motive force means is selected from the group consisting of: electro-thermal, mechanical, magnetic, electromechanical, electromagnetic, light, stress, strain, and chemical means for inducing motive forces.

23. A microelectromechanical (MEMS) filter for selectively impeding particulates in fluid flow, comprising:
   a first mesh layer;
   a second mesh layer;

said first and said second mesh layers being overlaid onto to each other; and at least one of said first or said second mesh layers being moved in at least two dimensions with respect to each other so as to selectively impede particulates in fluid flow.

24. Microelectromechanical (MEMS) filter of claim 23, further comprising means for offsetting said first and said second mesh layers with respect to each other so as to allow the bars of one said layer to block the openings between the bars of the other said layer.

25. Microelectromechanical (MEMS) filter of claim 24, further comprising means for applying a motive force means to at least one of said first and said second mesh layers so as to alternately form an "open" and a "closed" position, wherein said "open" position comprises a relative separation between said first and said second mesh layers and wherein said "closed" position comprises a lesser separation.

26. Microelectromechanical (MEMS) filter of claim 25, wherein said motive force means is selected from the group consisting of: electro-thermal, mechanical, magnetic, electromechanical, electromagnetic, light, stress, strain, and chemical means for inducing motive forces.

* * * * *